(12) United States Patent
Salamanca

(10) Patent No.: US 7,746,018 B2
(45) Date of Patent: Jun. 29, 2010

(54) ROBOT SYSTEM AND METHOD FOR REPOSITION AND/OR REMOVAL OF BASE PLATES FROM CATHODE STRIPPING MACHINES IN ELECTROMETALLURGICAL PROCESSES

(75) Inventor: Hugo Salamanca, Santiago (CL)

(73) Assignee: MI Robotic Solutions, Santiago (CL)

( * ) Notice: Subject to any disclaimer, the term of this patent is extended or adjusted under 35 U.S.C. 154(b) by 91 days.

(21) Appl. No.: 11/595,953

(22) Filed: Nov. 13, 2006

(65) Prior Publication Data

US 2007/0144005 A1 Jun. 28, 2007

Related U.S. Application Data

(60) Provisional application No. 60/734,973, filed on Nov. 10, 2005.

(51) Int. Cl.
*B25J 11/00* (2006.01)
(52) U.S. Cl. .................................. 318/568.11
(58) Field of Classification Search .............. 318/568.1, 318/568.11, 568.2, 568.21
See application file for complete search history.

(56) References Cited

U.S. PATENT DOCUMENTS

| | | | |
|---|---|---|---|
| 3,575,301 A * | 4/1971 | Panissidi | ..................... 414/618 |
| 4,142,639 A | 3/1979 | Ishikawa | |
| 4,166,754 A | 9/1979 | Scheel et al. | |
| 4,603,511 A | 8/1986 | Komatsu et al. | |
| 4,608,651 A | 8/1986 | Murakami et al. | |
| 4,620,362 A | 11/1986 | Reynolds | |
| 4,713,596 A | 12/1987 | Bose | |
| 4,818,173 A | 4/1989 | Khusro | |
| 4,818,174 A | 4/1989 | Arpiarian et al. | |
| 4,907,889 A * | 3/1990 | Simone | ...................... 360/92.1 |
| 4,926,105 A | 5/1990 | Mischenko et al. | |
| 4,986,723 A | 1/1991 | Maeda | |
| 5,098,644 A * | 3/1992 | McDaniels | ................... 376/261 |

(Continued)

FOREIGN PATENT DOCUMENTS

RU    1637968    3/1991

OTHER PUBLICATIONS

CSIRO, (Internet) QCAT Annual Report-Queensland Center for Advanced Technologies, pp. 1-32, 2003, U.S.A.

(Continued)

*Primary Examiner*—Bentsu Ro
(74) *Attorney, Agent, or Firm*—Gottlieb, Rackman & Reisman, P.C.

(57) ABSTRACT

At present, the reposition of base plates in an electrochemical process in the cathode stripping machine system is carried out manually, which implies a loss in the efficiency, high exposure to risk associated with the removal of plates and additional labor force being used. Due to these drawbacks, a robotic system is developed for the reposition and/or removal of base plates from cathode stripping machine. The robotic system comprises an anthropomorphous robotic manipulator and a gripping mechanism which allows taking the base plates from a mobile drawer rack and moves it through a defined path to the transfer station in a synchronized way with the control system of the cathode stripping machine, it replaces the base plates as they are rejected. Thus, most of the major problems associated with the safety of the personnel and the productivity of the manual and/or mechanical process are eliminated.

11 Claims, 4 Drawing Sheets

U.S. PATENT DOCUMENTS

Figure 1:
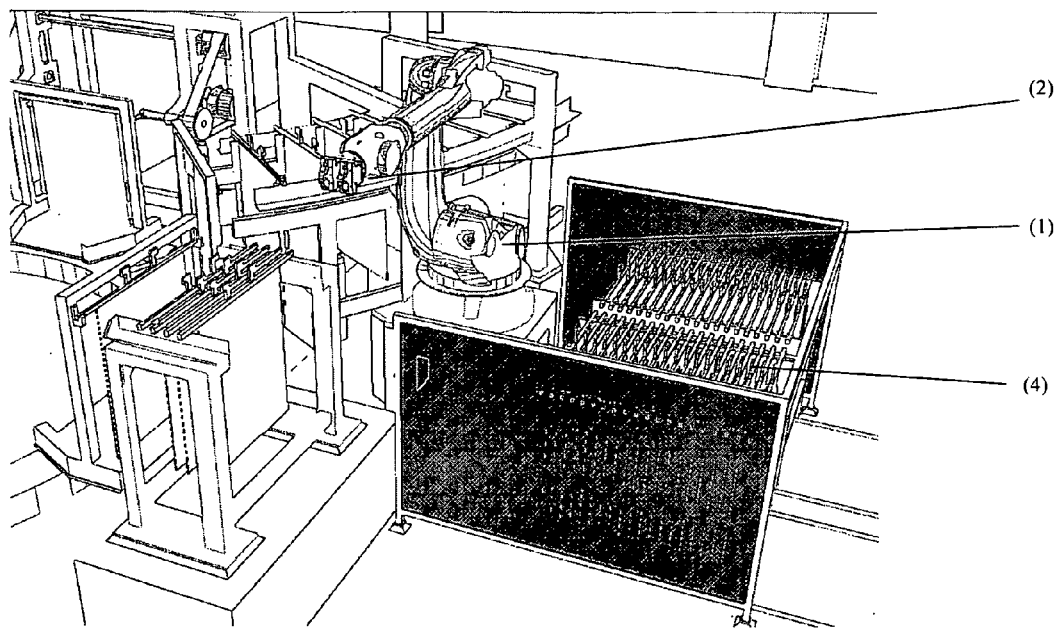

| | | | |
|---|---|---|---|
| 5,157,830 A | 10/1992 | Koch | |
| 5,178,506 A | 1/1993 | Meschi | |
| 5,310,248 A | 5/1994 | King et al. | |
| 5,341,854 A | 8/1994 | Zezulka et al. | |
| 5,428,285 A | 6/1995 | Koyama et al. | |
| 5,460,478 A | 10/1995 | Akimoto et al. | |
| 5,525,027 A | 6/1996 | Jinno et al. | |
| 5,567,285 A | 10/1996 | Menendez et al. | |
| 5,705,909 A | 1/1998 | Rajashekara | |
| 5,761,960 A | 6/1998 | Nagai et al. | |
| 5,777,267 A | 7/1998 | Szydel | |
| 5,789,890 A | 8/1998 | Genov et al. | |
| 5,988,855 A | 11/1999 | Marobin | |
| 6,037,733 A | 3/2000 | Genov et al. | |
| 6,371,717 B1 | 4/2002 | Grams et al. | |
| 6,601,468 B2 | 8/2003 | Grover et al. | |
| 6,635,157 B2 * | 10/2003 | Dordi et al. | 204/198 |
| 6,665,588 B2 | 12/2003 | Watanabe et al. | |
| 6,678,583 B2 | 1/2004 | Nasr et al. | |
| 6,689,257 B2 | 2/2004 | Mishima et al. | |
| 6,859,683 B2 | 2/2005 | Parker et al. | |
| 6,913,650 B2 | 7/2005 | Gilmore et al. | |
| 7,033,464 B2 | 4/2006 | Emesh et al. | |
| 7,039,499 B1 | 5/2006 | Nasr et al. | |
| 7,146,248 B2 | 12/2006 | Lent | |
| 7,260,450 B2 | 8/2007 | Okazaki et al. | |
| 7,280,890 B2 | 10/2007 | Seemann | |
| 2002/0173877 A1 | 11/2002 | Zweig | |
| 2003/0000645 A1 | 1/2003 | Dornfest | |
| 2003/0229420 A1 | 12/2003 | Buckingham et al. | |
| 2004/0000488 A1 * | 1/2004 | Yang | 205/96 |
| 2004/0016637 A1 | 1/2004 | Yang et al. | |
| 2004/0022940 A1 | 2/2004 | Nagai et al. | |
| 2004/0023495 A1 | 2/2004 | Butterfield et al. | |
| 2004/0037689 A1 | 2/2004 | Watanabe et al. | |
| 2004/0103740 A1 | 6/2004 | Townsend et al. | |
| 2004/0186624 A1 | 9/2004 | Oda et al. | |
| 2004/0187515 A1 | 9/2004 | Shu et al. | |
| 2004/0191026 A1 * | 9/2004 | Raitanen et al. | 414/172 |
| 2004/0206307 A1 | 10/2004 | Boroson et al. | |
| 2004/0251866 A1 | 12/2004 | Gan et al. | |
| 2004/0254677 A1 | 12/2004 | Brogardh et al. | |
| 2005/0065647 A1 | 3/2005 | Perry et al. | |
| 2005/0102061 A1 | 5/2005 | Lent | |
| 2005/0155865 A1 | 7/2005 | Mishima et al. | |
| 2005/0193901 A1 | 9/2005 | Buehler | |
| 2005/0271552 A1 | 12/2005 | Coassin et al. | |
| 2006/0151336 A1 | 7/2006 | Butterfield et al. | |
| 2006/0177922 A1 * | 8/2006 | Shamah et al. | 435/286.2 |
| 2006/0231414 A1 | 10/2006 | Butterfield et al. | |
| 2007/0125657 A1 * | 6/2007 | Sun et al. | 205/205 |
| 2007/0285046 A1 | 12/2007 | Yamaguchi et al. | |

OTHER PUBLICATIONS

Greer (IEEE), Selection Criteria for Sag Mill Drive Systems, pp. 901-908, 1990, U.S.A.

Metso Minerals (Internet), Autogenous/Semi-autogenous Mills, pp. 1-2, 2002, U.S.A.

Metson Minerals (Internet), Metso Capital Markets Day, pp. 1-31, 2004, U.S.A.

Lepka, Jaroslav; Stekl, Petr, 3-Phase AC Induction Motor Vector Control Using a 56F80x, 56F8100 or 56F8300 Device-Design of Motor Control Application, pp. Rev. 2, Feb. 2005, Freescale Semiconductor, Inc., U.S.A.

Spencer et al., (IEEE), Acoustic Emissions Monitoring of Sag Mill Performance, pp. 939-946, 1999.

Sheble, ISA, Mining's New Age, Internet, pp. 1-4, 2001.

CSIRO, (Internet) QCAT Annual Report-Queensland Center for Advanced Technologies, pp. 1-36, Jun. 2005, U.S.A.

Agnico-Eagle Mines Ltd., Variable Speed Control of SAG Mill in the Mining Industry, MInternet, pp. 1-2, 2004.

* cited by examiner

ROBOT SYSTEM AND METHOD FOR REPOSITION AND/OR REMOVAL OF BASE PLATES FROM CATHODE STRIPPING MACHINES IN ELECTROMETALLURGICAL PROCESSES

CROSS-REFERENCE TO RELATED APPLICATIONS

This application claims the benefit of provisional patent application Ser. No. 60/734,973 filed 2005 Nov. 10 by the present inventor

FEDERAL SPONSORED RESEARCH

Not Applicable

SEQUENCE LISTING OR PROGRAM

Not Applicable

BACKGROUND

1. Field of Invention

This invention relates to the use of robotic technology in mining industry to improve the system and method for the reposition and/or removal of base plates in cathode stripping machines, specifically in the electro-winning area.

2. Prior Art

The electrodeposition process is one of the current and simplest methods to recover, in a pure and selective way, the metals in a solution. This process mainly uses the permanent cathode technology, which consists in depositing the metal directly on the same mother blanks through an electrochemical process. This process is carried out in electrolytic cells until reaching the adequate weight for them to be removed and sent to the cathode stripping system. The most frequently used substrate in these cathodes if 316L stainless steel.

This technology uses different stripping machines. The most common are the following:

ISA Process, which is characterized by using a wax in the lower edge of the cathode to control the lower deposit, generating two metal plates and the stripping system is linear and U shaped.

Kidd Process (carousel), which is a variant machine very similar to the above, but it is a waxless technology which generates a blank joined with the two faces of the metal deposit and it uses a stripping system as a wheel with different work stations.

During cathode stripping process, some factors help certain plates to be rejected by the control system of the cathode stripping machine (plates with metal residues, plates with low weight or overweight, bent plates or plates requiring maintenance).

The base plates rejected and removed from the cathode stripping machine are not subjected to an automated reposition system to the return line, so the number of plates returning to the normal operation is lower than the number of plates fed to the stripping machine, with the resulting deficit of base plates in the seeding of cells.

The reposition of the missing base plates in the cells—as a result of the rejection being made by the control system of the stripping machine—is carried out manually and/or mechanically directly in the cells or by filling an additional rack parallel to the return line of the base plates. This rack provides the bridge crane with missing plates to complete the seeding process into the cells.

The removal and/or reposition of missing base plates manually and/or mechanically has some disadvantages, such as:

A decrease in the productivity of the stripping machine and a high accident rate level to carry out the removal of the rejected base plates.

Costs associated to the personnel involved in the manual and/or mechanical reposition.

Less availability of the bridge crane, due to the fact it should move away from its original path to take the base plates from some other place.

The manual reposition of the base plates in the cells is an activity which presents a high risk of accident rate.

The operators in charge of carrying out the manual reposition are subjected to a constant physical demand in harsh environmental conditions

SUMMARY

A robotic system and a robotized method have been developed for reposition and/or removal of base plate in cathode stripping machines, which is able to carry out this task in an automated way.

DRAWINGS

Figures

In the drawings, closely related figures share the same numbers, with different alphabetic suffixes.

FIG. 1. General view of a robot system.

Figure 2:
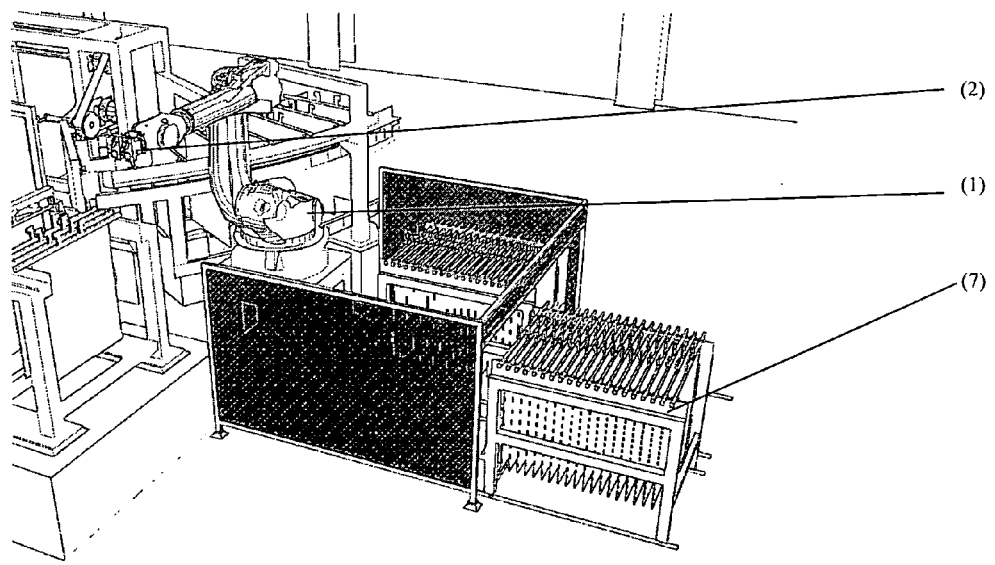

FIG. 2. General view of the mobile drawer.

Figure 3:
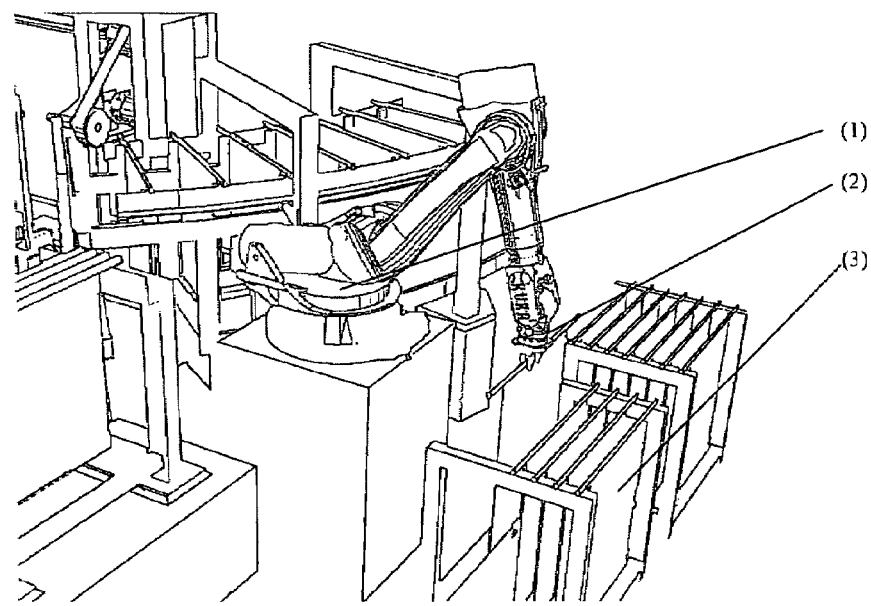

FIG. 3. View of a robotic manipulator taking a base plate from a mobile drawer rack locate at one side.

Figure 4:
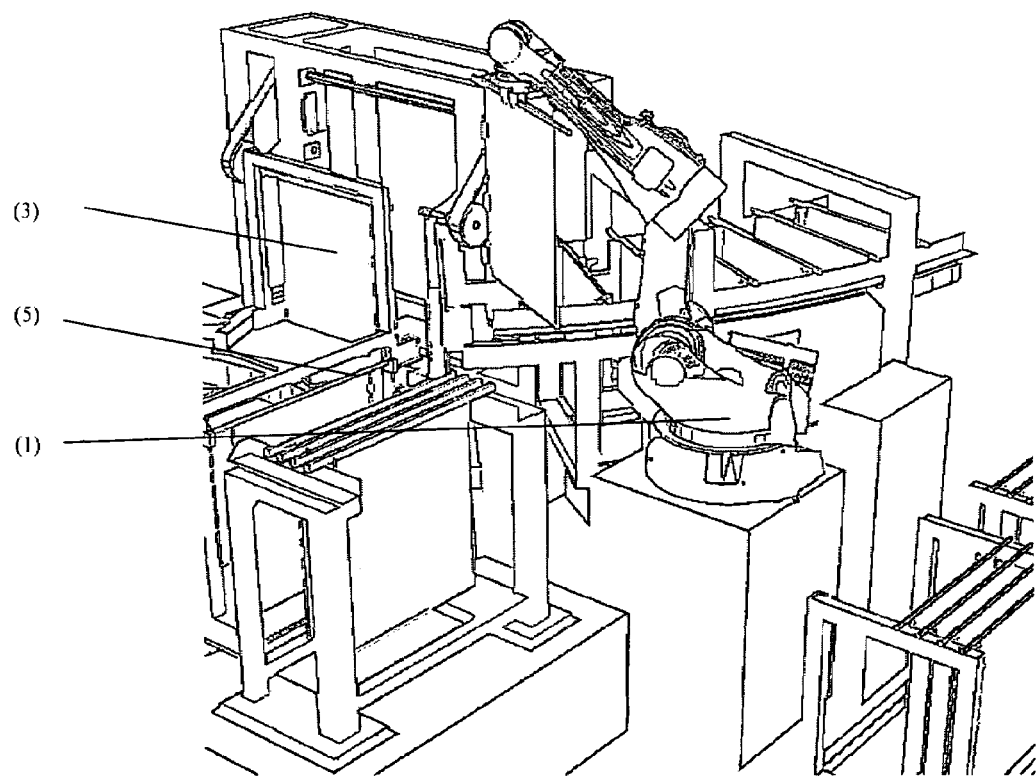
Figure 5:
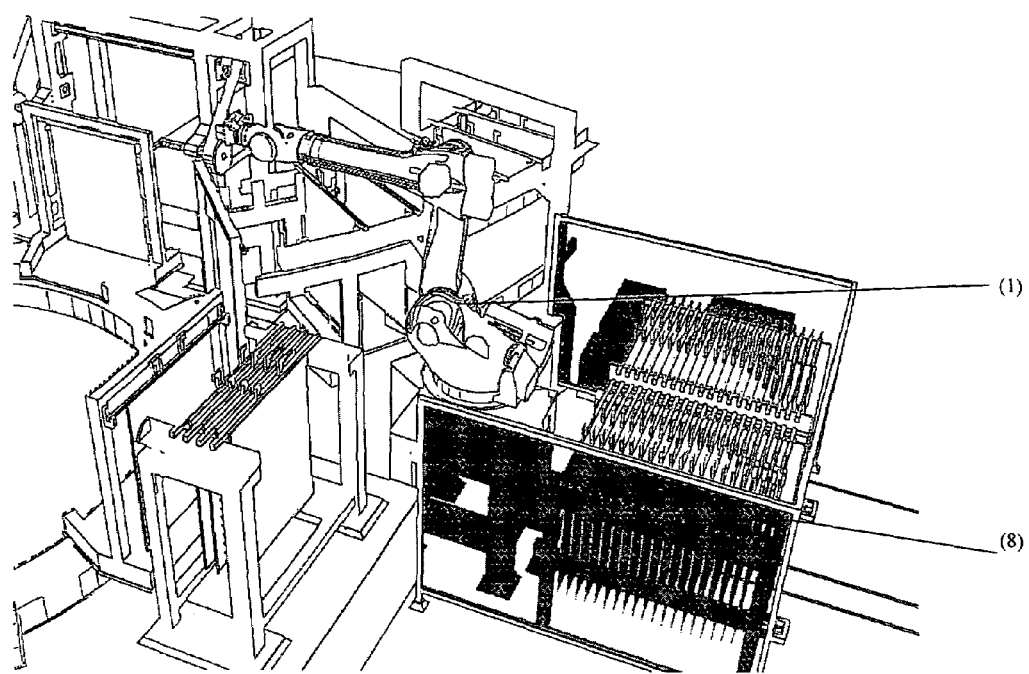
Figure 6:
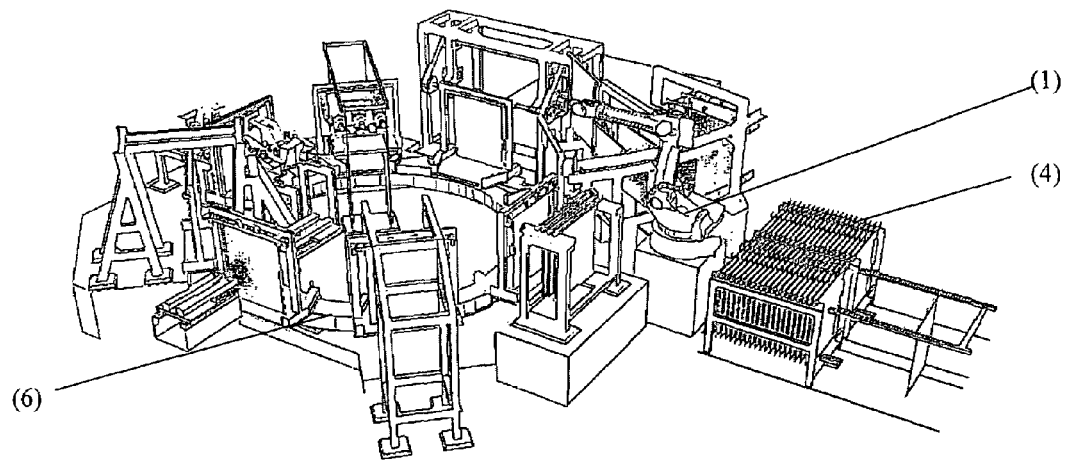

FIG. 4. View of a robotic manipulator placing the plate to the transfer station FIG. 5. View of a robotic manipulator placing the plate to the transfer station FIG. 6. View of the robotic manipulator for the reposition and/or removal of base plates integrated to the Kidd process.

Figure 7:
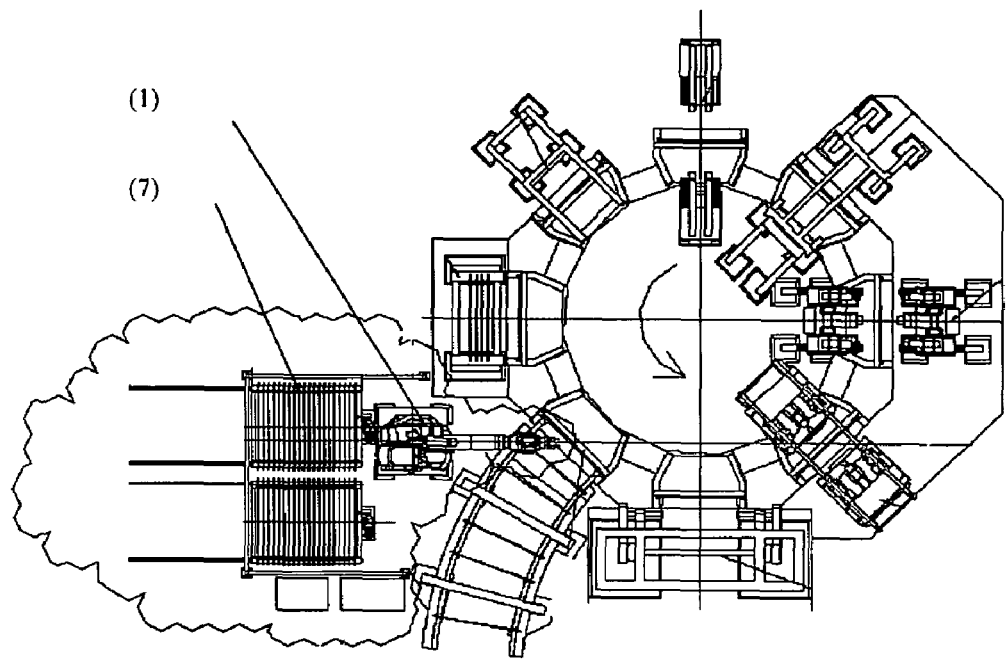

FIG. 7. View of the robotic manipulator for the reposition and/or removal of base plates integrated to the Kidd process.

Figure 8:
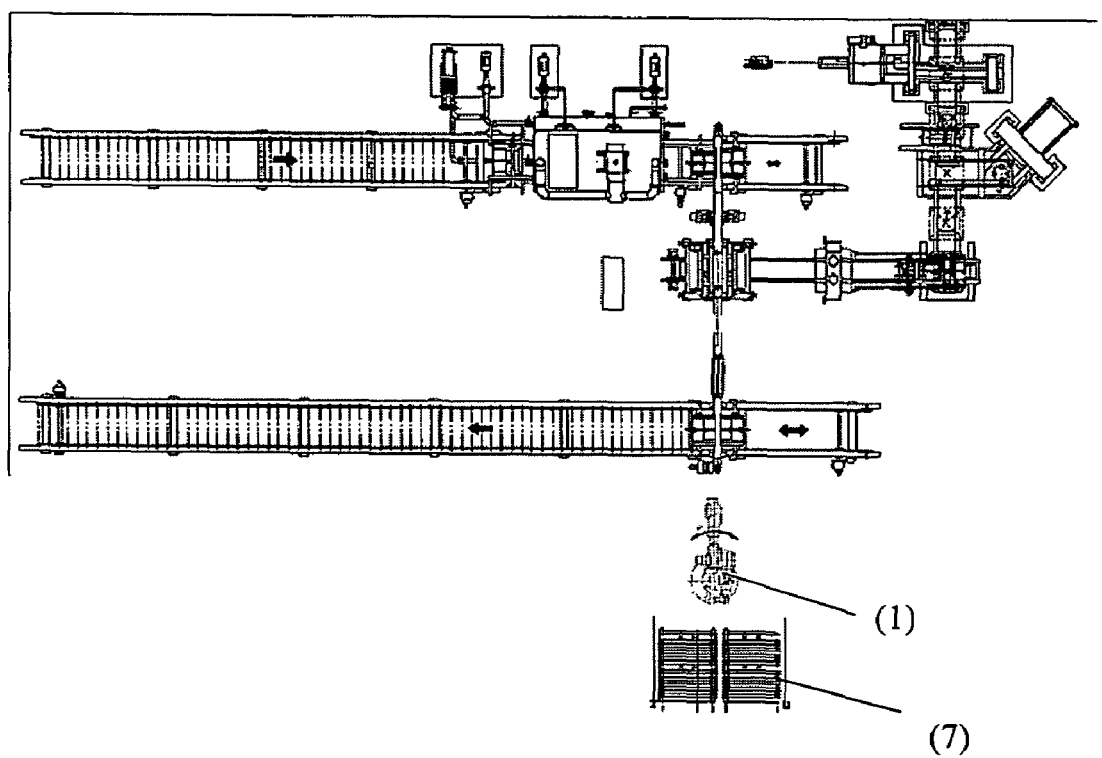

FIG. 8. View of the robotic manipulator for the reposition and/or removal of base plates integrated to the ISA process

DRAWINGS

Reference Numerals

1. Robotic manipulator
2. Gripping mechanism
3. Base plates
4. Mobile drawer rack
5. Transfer station
6. Control system of the cathode stripping machine
7. Second mobile drawer racks
8. The mobile drawer rack moves out

DETAILED DESCRIPTION

This invention relates to a new robot system as well as a robotic method for the reposition and/or removal of base plates from cathode stripping machines, which is carried out automatically through anthropomorphous robotic arms of at least 5 degrees of freedom, which are installed at one side of each stripping machine between the rejection station and the transfer station.

With reference to FIG. 1, FIG. 2, FIG. 3, FIG. 4, FIG. 5, FIG. 6, FIG. 7, and FIG. 8, the robot system is composed mainly of one anthropomorphous robotic manipulator of at least 5 degrees of freedom (1), provided with a communication, acquisition and control system, and a gripping mechanism (2) that allows to take the base plates (3) from a mobile drawer rack (4) located at one of its sides and moves it through a defined path to the transfer station (5), where synchronized with the control system of the cathode stripping machine (6) it repositions or removes the base plates as they are rejected.

Additionally, the system has two mobile drawer racks (7) from which the robotic manipulator (1) takes the base plates (3) in a sequential and programmed way, which allows to always keep base plates for reposition. The filling of base plates in the mobile drawer racks (7) is carried out automatically through the discharge of base plates transported. For this, the mobile drawer rack (8) moves out of the working area of the robot.

I claim:

1. A method for repositioning base plates from cathode stripping machines using an anthropomorphous robotic manipulator comprising the steps of
   said manipulator receiving data indicating a grade of a base plate which has completed a stripping cycle;
   said manipulator further receiving data indicating an attribute of mobile drawer racks and slots available in said racks for base plates;
   said manipulator taking said base plate from a stripping machine;
   said manipulator manipulating said base plate;
   said manipulator selecting a mobile drawer rack for delivery of said base plate, said selection based upon said grade of said base plate and availability of slots and said attribute of said mobile drawer rack; and
   said manipulator delivering said base plate to an available slot in said selected mobile drawer rack;
   wherein said manipulator is comprised of at least 5 degrees of freedom, a communication, acquisition, and control system, and gripper and
   said attribute is a grade for base plates in said rack.

2. The method of claim 1 wherein said manipulator is capable of taking, manipulating, and releasing base plates or cathodes in different paths within said manipulator's work area.

3. The method of claim 1 wherein said manipulator is mounted on a fixed support located between said mobile drawer racks and said stripping machine.

4. The method of claim 1 wherein said manipulator communicates directly or through a program logic controller interface with a control system for a wax or a waxless stripping process.

5. The method of claim 1 wherein said manipulator obtains and interprets information from an analogue or a digital sensor in a wax or a waxless stripping process.

6. The method of claim 1 wherein said manipulator generates an analogue or a digital signal to control an analogue or a digital input device.

7. The method of claim 1 wherein said gripper is pneumatically, hydraulically, or mechanically controlled.

8. The method of claim 1 wherein said gripper is comprised of at least 4 fingers.

9. The method of claim 1 wherein said manipulator includes an electrical system driven by three-stage induction motors with vectorial or scalar control.

10. The method of claim 1 wherein said manipulator operates the system automatically or semi-automatically, and also allows for solution scalability.

11. The method of claim 1 wherein said manipulator is integrated electronically with a stripping process characterized by a wax or a waxless technology.

* * * * *